United States Patent
McGuire

(10) Patent No.: US 7,782,246 B2
(45) Date of Patent: Aug. 24, 2010

(54) METHODS AND APPARATUS FOR SELECTING A TARGET FROM RADAR TRACKING DATA

(75) Inventor: Patric M. McGuire, Prosper, TX (US)

(73) Assignee: Raytheon Company, Waltham, MA (US)

(*) Notice: Subject to any disclaimer, the term of this patent is extended or adjusted under 35 U.S.C. 154(b) by 24 days.

(21) Appl. No.: 12/120,504

(22) Filed: May 14, 2008

(65) Prior Publication Data

US 2009/0073027 A1    Mar. 19, 2009

Related U.S. Application Data

(60) Provisional application No. 60/917,782, filed on May 14, 2007.

(51) Int. Cl.
*G01S 13/58* (2006.01)
(52) U.S. Cl. .................. 342/113; 342/13; 342/27; 342/62
(58) Field of Classification Search .................. 342/113, 342/13, 27, 62
See application file for complete search history.

(56) References Cited

U.S. PATENT DOCUMENTS

| | | | |
|---|---|---|---|
| 5,061,930 A | 10/1991 | Nathanson et al. | |
| 5,428,530 A | 6/1995 | Brown et al. | |
| 5,657,251 A * | 8/1997 | Fiala | 342/162 |
| 6,920,827 B2 | 7/2005 | Lloyd | |
| 6,980,151 B1 | 12/2005 | Mohan | |
| 7,066,427 B2 * | 6/2006 | Chang | 244/3.19 |
| 7,104,496 B2 | 9/2006 | Chang | |
| 2003/0228032 A1 | 12/2003 | Rui et al. | |
| 2006/0049978 A1 * | 3/2006 | Siegel | 342/159 |
| 2006/0175464 A1 | 8/2006 | Chang | |

OTHER PUBLICATIONS

Raytheon U.S. Appl. No. 11/470,900, filed Sep. 7, 2006 for System and Method for Attitude Control of a Flight Vehicle using Pitch-Over Thrusters, not yet published.

* cited by examiner

*Primary Examiner*—Thomas H Tarcza
*Assistant Examiner*—Timothy A Brainard
(74) *Attorney, Agent, or Firm*—The Noblitt Group, PLLC

(57) ABSTRACT

Methods and apparatus for selecting a target from radar data according to various aspects of the present invention operate in conjunction with a real-time data source and a countermeasure system. The real-time data source provides tracking information for at least one potential target from which a lead track associated with one target meeting a predetermined threshold requirement may be selected for engagement by the countermeasure system.

12 Claims, 2 Drawing Sheets

METHODS AND APPARATUS FOR SELECTING A TARGET FROM RADAR TRACKING DATA

CROSS-REFERENCES TO RELATED APPLICATIONS

This application claims the benefit of U.S. Provisional Patent Application No. 60/917,782, filed May 14, 2007, and incorporates the disclosure of the application by reference.

BACKGROUND OF INVENTION

Target acquisition systems may lock on to a target by various methods including radar signature, heat signature, and infrared signature. The process of locking on to a target may be initiated either manually or automatically depending on the application and environment. Target acquisition systems that operate in restricted spaces or with environments requiring acquisition times of less than one second may not discriminate between a target of interest and a false target within the required window for successfully engaging a target without potentially firing at a non-threatening target.

SUMMARY OF THE INVENTION

Methods and apparatus for selecting a target from radar data according to various aspects of the present invention operate in conjunction with a real-time data source and a countermeasure system. The real-time data source provides tracking information for at least one potential target from which a lead track associated with one target meeting a predetermined threshold requirement may be selected for engagement by the countermeasure system.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various computers, networks, servers, databases, and the like, which may carry out a variety of functions. In addition, the present invention may be practiced in conjunction with any number of networks, storage media, or real-time data sources, and the systems described are merely exemplary applications for the invention. Further, the present invention may employ any number of conventional techniques for transferring data, calculating information, presenting information, storing information, and the like.

Figure 1:
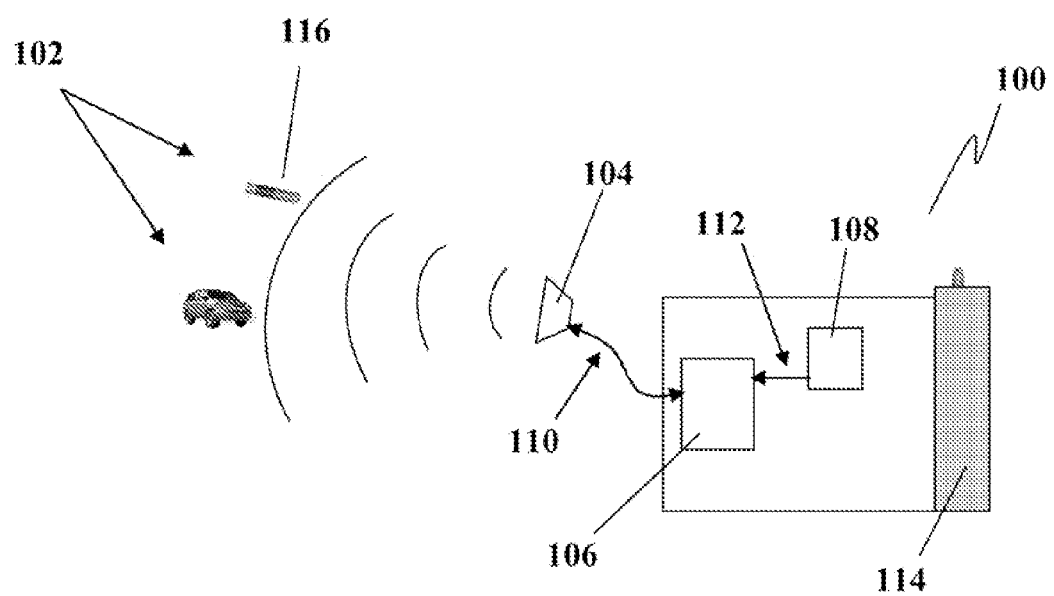
FIG. 1 representatively illustrates a countermeasure system in accordance with an exemplary embodiment of the present invention.

Referring to FIG. 1, methods and apparatus for selecting a target according to various aspects of the present invention operate in conjunction with a countermeasure system 100 connected to a real-time data source 104, such as a radar system. The countermeasure system 100 may be configured to respond to and engage an identified threat from among various other identified potential targets 102 within a given area. For example, a threat discrimination system 106 according to various aspects of the present invention operates in conjunction with the real-time data source 104 that may be configured to provide real-time tracking data 110 for a group of potential targets 102. A threat characteristic system 108 may provide threat characteristic data 112 to the threat discrimination system 106 which combines that information with the real time tracking data 110 to select a lead track 116 for engagement. The lead track 116 and related tracking data may then be sent to a fire control system 114 which selectively engages the target with a countermeasure.

The potential targets 102 comprise at least one object within a given area or space. The potential targets 102 may comprise, for example, various objects in motion, such as vehicles, aircraft, birds, and fired projectiles. The potential targets 102 may be guided or unguided and may comprise any suitable material such as lead, steel, or explosive elements. The potential targets 102 may also move in any manner such as along a trajectory, along a linear target track, or along an irregularly unmarked path.

The lead track 116 is a single target selected for engagement by the countermeasure system 100. The lead track 116 may be among the potential targets 102 being tracked by the real-time data source 110. In an exemplary embodiment, the lead track 116 comprises a rocket propelled grenade ("RPG").

The real-time data source 104 generates real-time tracking data 110 relating to the motion of the potential targets 102. The real-time data source 104 may comprise any system for gathering real-time data such as a radar system, an infrared tracking system, a laser tracking system, or the like. The real-time data source 104 may comprise any single or multiple method of collecting real-time tracking data 110. For example, in one embodiment, the real-time data source 104 may comprise a radar system integrated into the countermeasure system 100 that is configured to produce independent track data for each of the potential targets 102.

The real-time tracking data 110 relates to the velocity parameters and directional motion of the potential targets 102. Real-time tracking data 110 may comprise any information capable of defining motion of the potential targets such as the path of motion, velocity, acceleration, and estimated position at a given point of time in the future. The real-time tracking data may be further broken down into vector components or other suitable data forms comprising part or all of a global value such as velocity. The real-time tracking data 110 may be configured in any suitable manner and may comprise unprocessed radar imaging data or data that has been subjected to preprocessing steps such as image or individual track discrimination. The real-time tracking data 110 may comprise either analog or digital data.

The real-time tracking data 110 may be generated by any suitable method or process. For example, in an area of approximately one-half a square kilometer real-time data may be generated by various objects in motion such as vehicles, aircraft, birds, and fired projectiles. In one embodiment, an RPG may be fired from a fixed location towards the countermeasure system 100 and the real-time data source 104 generates the real-time tracking data 110 as the RPG travels from its point of origin towards the countermeasure system 100. The real-time tracking data 110 provided by the real-time data source 104 may comprise information such as when the RPG was fired, the velocity and acceleration of all potential targets 102, the directional components of all the potential targets 102 in relation to the real-time data source 104, the amount of time elapsed since the RPG was fired, and estimates of time of impact or potential points of intercept.

The discrimination system 106 selects a lead track 116 for engagement from the group of potential targets 102. The discrimination system 106 may comprise any suitable system for analyzing the real-time tracking data 110 and identifying a potential threat. For example, the discrimination system 106 may comprise a conventional computer and/or an integrated circuit card assembly capable of analyzing the real-time tracking data 110 associated with each of the potential targets 102. The discrimination system 106 may comprise, for example, a dedicated processor and a memory module, or the discrimination system 106 may be integrated into preexisting systems or computers, such as a tracking computer or the real-time data source 104. The discrimination system 106 may further be implemented entirely or partially through software stored in memory and executed by the processor, and/or may be implemented entirely or partially via hardware.

Figure 2:
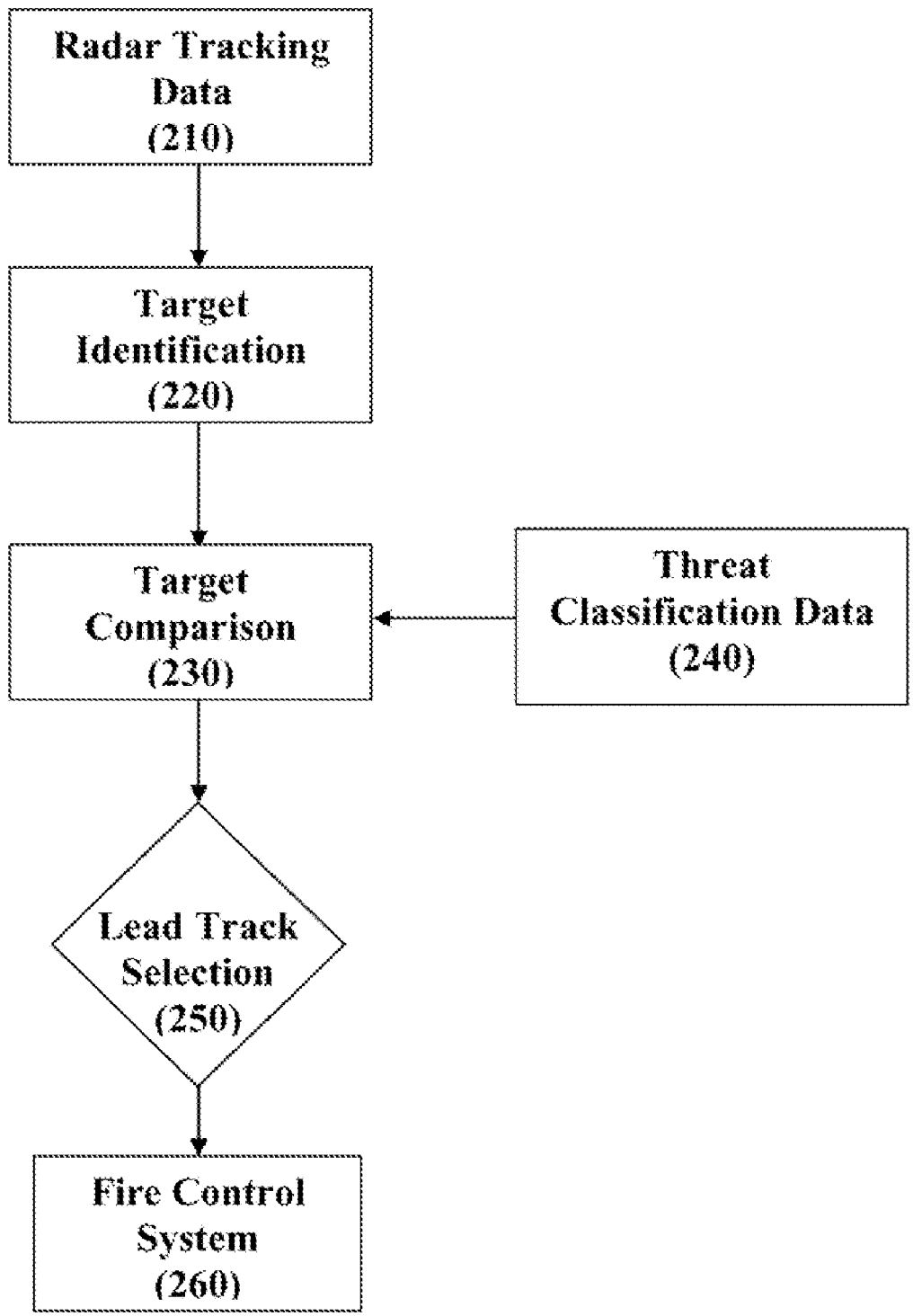
FIG. 2 is a block diagram of the selection process for a target.

Referring now to FIG. 2, in one embodiment, the discrimination system 106 may be configured to process the real-time tracking data 110 and identify each potential target 102, (210). Potential targets 102 may be identified by any suitable criteria such as proximity, relative directional velocity, size, shape, infrared signature, or they may include all objects observed by the real-time data source 104. Once the discrimination system 106 has identified the potential targets 102, (220), the associated real-time tracking data 110 for each independent potential target 102 may be analyzed and compared against all of the other potential targets 102, (230).

Each potential target 102 may also be evaluated based on the ability of the countermeasure system 100 to successfully intercept the potential target 102 at some point between the current position of the potential target 102 and the countermeasure system 100. For example, if one of the potential targets 102 is traveling in a direction away from the countermeasure system 100 then the discrimination system 106 may drop that entity from consideration for interception. Conversely, if one of the potential targets 102 is projected along a track directed at or near the countermeasure system 100, the discrimination system 106 may compare the projected track to predetermined performance capabilities of the countermeasure. If the countermeasure system 100 is determined to be able to intercept the potential target 102 that potential target 102 may be subjected to additional analysis or comparison to known threats.

Potential targets 102 within the window of interceptability may be further compared against the threat characteristic system 108. The threat characteristic system 108 provides profile information for known classes of threats (240). The threat characteristic system 108 may comprise any suitable system for supplying the discrimination system 106 with threat characteristics. For example, the threat characteristic system 108 may comprise parametric data of known threats stored as a table, an array, a matrix, or in other some other form in a recordable medium. This data may then be supplied to the discrimination system 106 by any suitable method such as via a high speed data connection, a wireless data connection, or through an integrated circuit.

In one embodiment, the threat characteristic system 108 may comprise velocity component information for an RPG. This information may include data such as minimum and maximum velocity ranges for known RPGs and the flight characteristics of RPGs. In another embodiment, the threat characteristic system 108 may comprise threshold values delineating velocities below which the countermeasure system 100 may be unresponsive to. For example, the discrimination system 106 may disregard potential targets 102 with velocity components in the range of known flying speeds of birds. In yet another embodiment, a if a potential target 102 is found to have a velocity within the known parametric bounds associated with a RPG, then the potential target 102 may be identified as the lead track 116 and selected for engagement to the exclusion of the remaining potential targets 102, (250). The discrimination system 106 may then forward the real-time tracking data 110 for the lead track 116 to the fire control system 114.

The fire control system 114 monitors the lead track 116 and issues a launch command when the lead track 116 is within the launch window of the countermeasure (260). The fire control system 114 may comprise any system or combination of systems for controlling the launch of the countermeasure. The lire control system 114 may be integrated with the real-time data source 104, the countermeasure system 100, or it may be configured as a stand alone system.

In the foregoing specification, the invention has been described with reference to specific exemplary embodiments. Various modifications and changes may be made without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any appropriate order and are not limited to the specific order presented in the claims. Additionally, the components and/or elements recited in any apparatus claims may be assembled or otherwise operationally configured in a variety of permutations and are accordingly not limited to the specific configuration recited in the specification and shown in the drawings.

Benefits, advantages, and solutions to problems have been described above with regard to particular embodiments. Any benefit, advantage, solution to problem or any element that may cause any particular benefit, advantage or solution to occur or to become more pronounced are not to be construed as critical, required or essential features or components of any or all the claims.

As used in this description, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the invention.

The invention claimed is:

1. A computer implemented method for selecting a target from real-time tracking data, comprising:
   receiving real-time tracking data for at least one potential target from a real-time data source;
   comparing the real-time tracking data for each of the at least one potential targets against the real-time tracking data for any additional potential targets from among the at least one potential targets;
   evaluating the real-time tracking data for each of the at least one potential targets against a predetermined performance capability of a countermeasure;
   determining the ability of the countermeasure to successfully intercept each of the at least one potential targets;
   eliminating from potential selection as a lead track any of the at least one potential targets that cannot be successfully intercepted by the countermeasure; and
   selecting the lead track from any of the at least one potential targets that have not been eliminated from potential selection as the lead track, wherein the lead track comprises an interceptable threat that can be successfully intercepted.

2. A computer-implemented method of selecting a target according to claim 1, wherein comparing the real-time tracking data further comprises:
   discriminating the relative velocities and directions of each of the at least one potential targets; and
   analyzing the relative velocities and directions of each of the at least one potential targets over a period of time.

3. A computer-implemented method of selecting a target according to claim 1, wherein the lead track is determined by comparing the real-time tracking data to a known set of properties for a predetermined threat.

4. A computer-implemented method of selecting a target according to claim 1, further comprising forwarding the lead track to a fire control system.

5. A computer system for selecting a target from real-time tracking data, wherein the computer system is configured to:
   receive real-time tracking data from a real-time data source for at least one potential target;
   compare the real-time tracking data for each of the at least one potential targets against the real-time tracking data for any additional potential targets from among the at least one potential targets;
   evaluate the real-time tracking data for each of the at least one potential targets against a predetermined performance capability of a countermeasure;
   determine the ability of the countermeasure to successfully intercept each of the at least one potential targets;
   eliminate from potential selection as a lead track any of the at least one potential targets that cannot be successfully intercepted by the countermeasure; and
   select the lead track from any of the at least one potential targets that have not been eliminated from potential selection as the lead track, wherein the lead track comprises an interceptable threat that can be successfully intercepted.

6. A computer system for selecting a target according to claim 5, wherein comparing the real-time tracking data further comprises:
   discriminating the relative velocities and directions of each of the at least one potential targets; and
   analyzing the relative velocities and directions of each of the at least one potential targets over a period of time.

7. A computer system for selecting a target according to claim 5, wherein the lead track is determined by comparing the real-time tracking data to a known set of properties for a predetermined threat.

8. A computer system for selecting a target according to claim 5, further comprising forwarding the lead track to a fire control system.

9. A computer readable medium storing instructions executable by a computer, wherein the instructions cause the computer to execute a process for selecting a target from real-time tracking data, comprising:
   receiving real-time tracking data from a real-time data source for at least one potential target;
   comparing the real-time tracking data for each of the at least one potential targets against the real-time tracking data for any additional potential targets from among the at least one potential targets;
   evaluating the real-time tracking data for each of the at least one potential targets against a predetermined performance capability of a countermeasure;
   determining the ability of the countermeasure to successfully intercept each of the at least one potential targets;
   eliminating from potential selection as a lead track any of the at least one potential targets that cannot be successfully intercepted by the countermeasure; and
   selecting the lead track from any of the at least one potential targets that have not been eliminated from potential selection as the lead track, wherein the lead track comprises an interceptable threat that can be successfully intercepted.

10. A medium according to claim 9, wherein comparing the velocity parameters further comprises:
    discriminating the relative velocities and directions of each of the at least one potential targets; and
    analyzing the relative velocities and directions of each of the at least one potential targets over a period of time.

11. A medium according to claim 9, wherein the lead track is determined by comparing the real-time tracking data to a known set of properties for a predetermined threat.

12. A medium according to claim 9, further comprising forwarding the lead track to a fire control system.

* * * * *

UNITED STATES PATENT AND TRADEMARK OFFICE
CERTIFICATE OF CORRECTION

| | | |
|---|---|---|
| PATENT NO. | : 7,782,246 B2 | |
| APPLICATION NO. | : 12/120504 | |
| DATED | : August 24, 2010 | |
| INVENTOR(S) | : Patric M. McGuire | |

It is certified that error appears in the above-identified patent and that said Letters Patent is hereby corrected as shown below:

In column 4, line 14, after "embodiment," delete "a".

In column 4, line 27, delete "lire" and insert -- fire --, therefor.

Signed and Sealed this
Nineteenth Day of June, 2012

David J. Kappos
*Director of the United States Patent and Trademark Office*